UNITED STATES PATENT OFFICE.

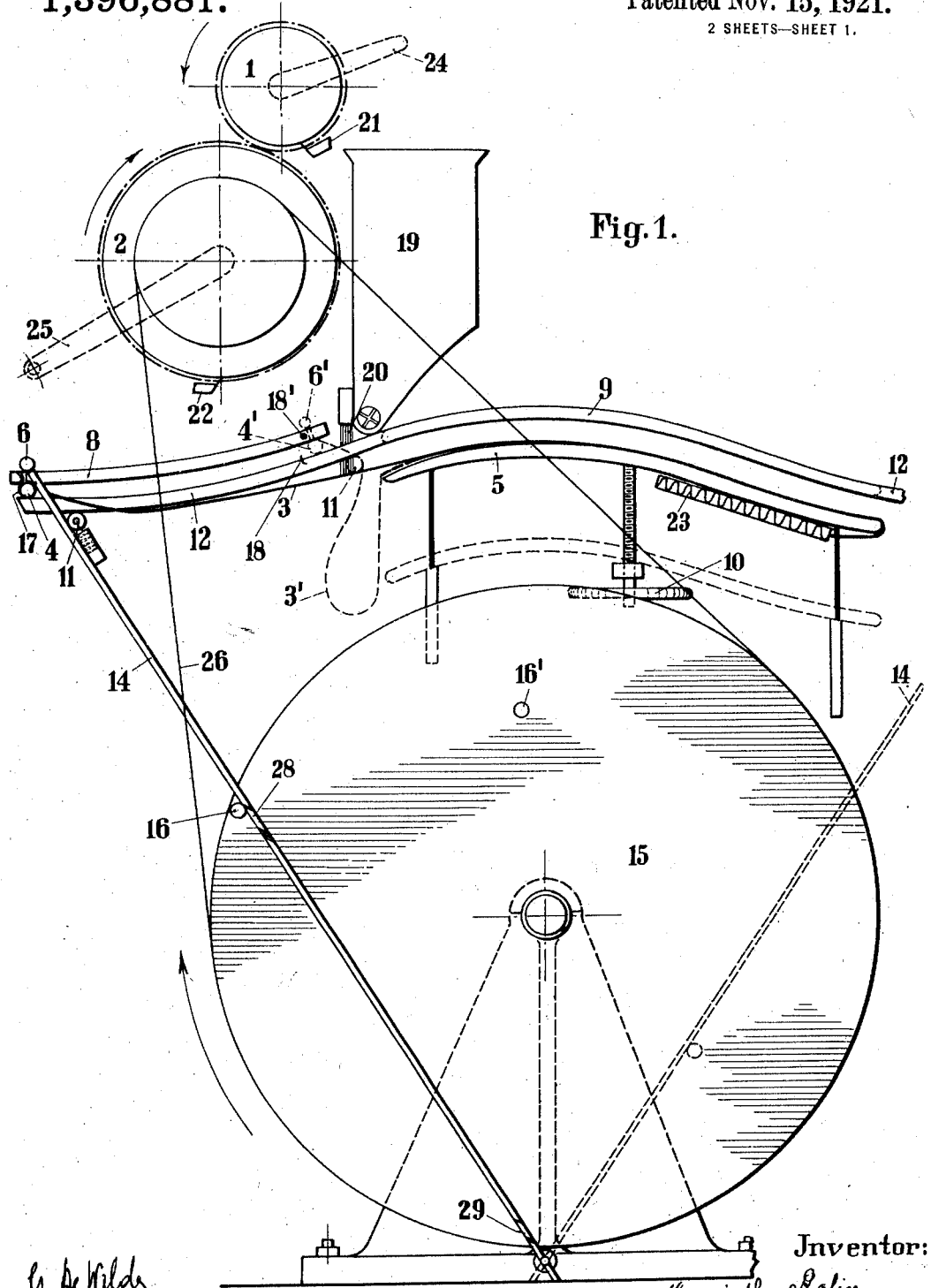

HYACINTHE ROLIN, OF NAMUR, BELGIUM.

DOUGH-ROLLING APPARATUS FOR MAKING LONG LOAVES AND LIKE PRODUCTS.

1,396,881. Specification of Letters Patent. Patented Nov. 15, 1921.

Application filed February 9, 1921. Serial No. 443,633.

*To all whom it may concern:*

Be it known that I, HYACINTHE ROLIN, a subject of the King of Belgium, residing at Namur, Belgium, have invented new and useful Improvements in Dough-Rolling Apparatus for Making Long Loaves and Like Products, of which the following is a specification.

This invention relates to apparatus for rolling dough and has for its object to enable the dough to be mechanically rolled into the form of long loaves and other products of a similar form, thus attaining the advantages of an automatic, mechanical and regular formation of the loaves, and of the production of loaves which are free from the undesirable irregularities of shape inherent in the hand rolling process.

In the accompanying drawings which show by way of example a method of carrying the invention into effect:—

Figure 1 is an elevation of the apparatus,

Figure 3:
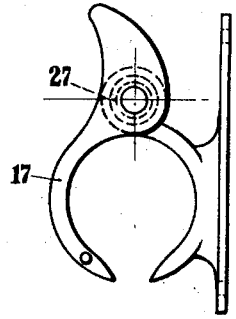
Fig. 3 is a detail view of the means for controlling the movement of the rod which carries one end of the band which receives the dough.
Figure 2:
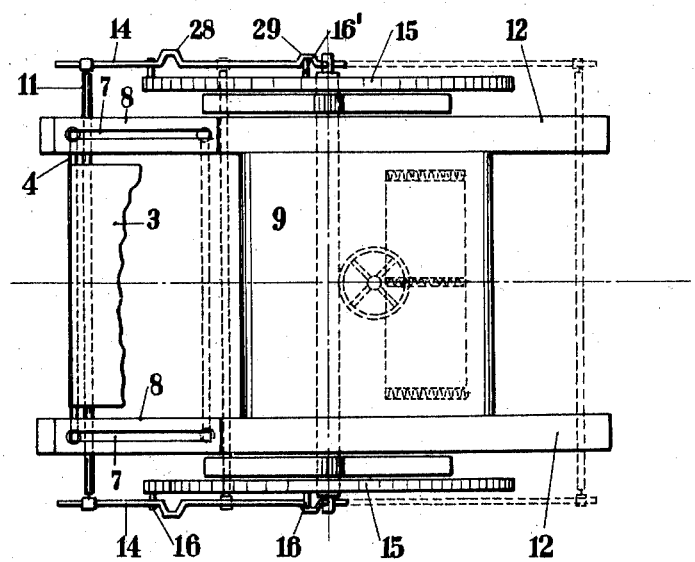
Fig. 2 is a plan drawn to a smaller scale, the drive and sprinkler being omitted

The apparatus comprises a pair of rollers 1, 2 between which pieces of dough of any shape are introduced, having been weighed previously. The dough rolling device proper is disposed below the rollers and receives the dough as it issues therefrom upon a band 3 made of strong fabric or other suitable material. One end of the band is carried by a movable rod 4 while the other end is fixed at the side of, or under a table or plate 5.

The movable rod 4 is capable of limited forward and backward movement, but cannot pass beyond the forward end of the table 5. In Fig. 1 the extreme positions of the rod are shown at 4 and 4'. The rod is provided with two guides 6 engaging in slots or grooves 7 of fixed length formed in bars or strips 8.

Above the table 5 and parallel thereto is disposed a similar table or plate 9 which may comprise a single metallic plate or may be formed from a number of plates. The space between the members 5 and 9 may be regulated by means of a hand operated screw 10 by which the table 5 is raised or lowered.

A roller 11 passes beneath the table 9 and the extensions 12 of the longitudinal edges thereof, and in order that this roller may maintain the member 3 against the lower surface of the table 9 its axis is mounted upon spring supports 13. The supports for the roller 11 are mounted upon levers 14 disposed at each side of the table 5 and pivoted at their lower ends to a fixed portion of the framework.

These levers are arranged so that their upper ends may swing from one end of the extensions 12 to the other.

The levers 14 which are connected by the roller 11 are reciprocated by two disks 15 by means of pins 16, 16' in a manner well known in connection with the conversion of rotary motion into reciprocating motion. The levers 14 may carry cranked portions 28, 29 for the passage of pins 16 carried by the disks 15.

In order that the return movement may take place more rapidly, and also to allow sufficient time for charging the member 3, a second pin 16' is provided which maintains the lever in its starting position while the pin 16 passes below, so that a stoppage is effected before the pin 16, which has a greater distance to travel, again engages the lever.

The levers 14 move the rod 4 as well as the roller 11, and, since the rods 4 cannot follow the levers 11 to the end of their traverse, the latter carry a device adapted to permit the instantaneous release of the connection between the levers and the rod. The drawings show a catch 17 having a movable arm controlled by trips or stops 18, 18'. This catch opens under the action of the trip 18 at the required moment during the movement of the levers 14 to release the rod at its position 4', and closes again under the tension of a coiled spring 27, while it is opened again by the stop 18' to reëngage the rod during its return movement. Flour is sprinkled from a receptacle 19 upon the member 3 at the required moment and a brush 20 spreads the flour so as to prevent the dough from sticking to the rollers 1 and 2.

To prevent tearing of the member 3 at its point of attachment to the table 5, in consequence of the movements of the roller 11, the member 3 is rendered yieldable by securing one end to the free end of a coiled spring 23.

The apparatus may be hand operated by means of the handle 24, or may be operated mechanically by the crank 25, the disks 15 being driven by means of bands or chains 26.

The operation of the apparatus is as follows:—

Pieces of dough of any shape and of known weight are introduced between the rollers 1, 2 and so pass onto the member 3. At this moment the levers 14 are moved and carry the rod 4 to the position indicated at 4'. The member 3 thus forms a pocket (shown in dotted lines at 3', Fig. 1) in which the dough is disposed. The continued movement of the levers 14 causes the roller 11 to continue its course under the member 3 thus causing the pocket formed to pass between the members 5 and 9 where it becomes compressed and rolls the dough in such a manner that it issues from the space between the members 5 and 9 evenly formed and rounded off at its ends.

The invention has been described and shown by way of example only and it is to be understood that it is not limited to the exact construction described and shown herein, since many modifications of the details of construction may be made, without departing from the spirit of the invention.

I claim:

1. Apparatus for rolling dough to form long loaves and other flour products comprising a pair of substantially parallel surfaces, a sheet of flexible material, means for charging said sheet with dough, means for bending said sheet to form a pocket, and means for rolling said pocket along and between said surfaces.

2. Apparatus for rolling dough to form long loaves and other flour products comprising a pair of parallel upper and lower tables having upper and lower surfaces and forward and rearward ends, a fabric having forward and rearward ends connected at its rearward end to the rearward end of the lower of said tables and extending along the upper surface of said lower table beyond the forward end thereof, a movable rod disposed above said upper table and carrying the forward end of said fabric, a traversing roller, means for moving said rod along the upper surface of said upper table and for moving said traversing roller along the lower surface of said upper table, means for limiting the movement of said rod and a pair of rollers disposed above the rearward end of said fabric.

3. Apparatus for rolling dough to form long loaves and other flour products comprising an upper table having a lower surface, a pair of edges and forward and rearward extensions thereof, a lower vertically adjustable table having an upper surface and forward and rearward ends and disposed substantially parallel to said upper table, a fabric having forward and rearward ends connected at its rearward end to the rearward end of said lower table and extending along the upper surface of said table and beyond the forward end thereof, a movable rod carrying the forward end of said fabric, and disposed above the forward extension of said upper table, a traversing roller disposed under the lower surface of said table, a pair of crank arms pivoted at their lower ends and disposed at the sides of said table, resilient connections between said traversing roller and said crank arms, connections between said rod and said crank arms, means for rocking said crank arms about their lower ends, forward and rearward limits of movement for said rod, means for releasing the connections between said rod and said crank arms at the rearward limit of movement of said rod, and a pair of rollers disposed above said fabric.

4. Apparatus for rolling dough to form long loaves and other flour products comprising a pair of substantially parallel surfaces, a sheet of flexible material, a pair of rollers disposed above said sheet, means for bending said sheet to form a pocket, and means for rolling said pocket along and between said surfaces.

5. Apparatus for rolling dough to form long loaves and other flour products comprising a pair of substantially parallel surfaces, a sheet of flexible material, means for charging said sheet with dough, a flour sprinkler disposed above said sheet, a brush disposed over said sheet, means for holding said sheet to form a pocket, and means for rolling said pocket along and between said surfaces.

6. Apparatus for rolling dough to form long loaves and other flour products comprising a pair of parallel upper and lower tables having upper and lower surfaces and forward and rearward ends, a fabric having forward and rearward ends connected at its rearward end to the rearward end of the lower of said tables and extending along the upper surface of said lower table beyond the forward end thereof, a movable rod disposed above said upper table and carrying the forward end of said fabric, a traversing roller, means for moving said rod along the upper surface of said upper table and for moving said traversing rod along the lower surface of said upper table, means for limiting the movement of said rod, and means for vertically adjusting said lower table.

7. Apparatus for rolling dough to form long loaves, and other flour products comprising a pair of substantially parallel surfaces, a fabric having two ends connected at one end to one of said surfaces and extending between said surfaces, means for charging said fabric with dough, and means for rolling said fabric along and between said surfaces in the form of a pocket.

In testimony whereof I affix my signature.

HYACINTHE ROLIN.

Witnesses:
Y. G. BABAN,
EMILE VANNVANSELLE.